(12) United States Patent
Minami et al.

(10) Patent No.: US 8,100,462 B2
(45) Date of Patent: Jan. 24, 2012

(54) FLOOR UNDERFRAME OF VEHICLES

(75) Inventors: Hidekazu Minami, Fujisawa (JP); Masakatsu Takagi, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 282 days.

(21) Appl. No.: 12/445,855

(22) PCT Filed: Oct. 15, 2007

(86) PCT No.: PCT/JP2007/070056
§ 371 (c)(1),
(2), (4) Date: Apr. 16, 2009

(87) PCT Pub. No.: WO2008/047749
PCT Pub. Date: Apr. 24, 2008

(65) Prior Publication Data
US 2010/0320800 A1 Dec. 23, 2010

(30) Foreign Application Priority Data
Oct. 20, 2006 (JP) .................................. 2006-286644

(51) Int. Cl.
*B62D 25/20* (2006.01)
(52) U.S. Cl. ......... 296/187.08; 296/190.03; 296/193.07; 296/204
(58) Field of Classification Search ............. 296/187.08, 296/190.03, 190.05, 190.07, 190.06, 193.07, 296/204
See application file for complete search history.

(56) References Cited

FOREIGN PATENT DOCUMENTS

| JP | 50-115327 | A | | 9/1975 |
|---|---|---|---|---|
| JP | 62-199551 | A | | 9/1987 |
| JP | 10-236342 | A | | 9/1998 |
| JP | 11-170942 | A | | 6/1999 |
| JP | 11-208516 | A | | 8/1999 |
| JP | 2000-085620 | A | | 3/2000 |
| JP | 2006-069511 | A | * | 3/2006 |

* cited by examiner

Primary Examiner — Jason S Morrow

(57) ABSTRACT

A vehicle floor underframe 5, which is arranged under a cab, includes: a front section 11, which is deployed on the front side of the cab and extends along the length of the vehicle; a rising section 12, which bends at the back end of the front section 11 and extends upward; a back section 13, which bends at the top end of the rising section 12 and extends towards the rear of the vehicle and is deployed under a passenger seat 7; and a buckling section 14, which is formed in the back section 13 and has stress concentration when a load from at least either the front end of the front section 11 or the back end of the back section 13 is applied in a compressing direction. The buckling section 14 is deployed under approximately the center of the passenger seat 7 along the length of the vehicle. The back section 13 bends and deforms upwards at the buckling section 14 when a load is applied from at least either the front end of the front section 11 or the back end of the back section 13 in a compressing direction.

1 Claim, 4 Drawing Sheets

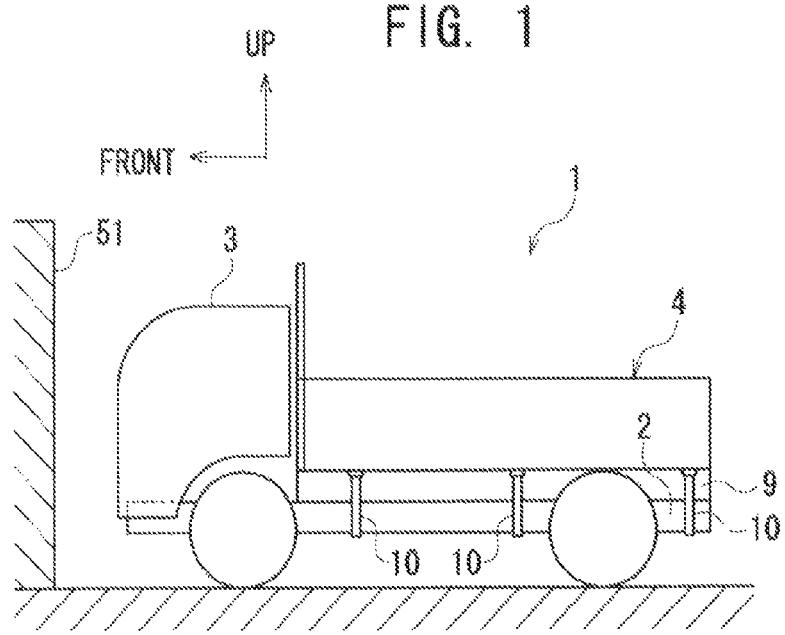
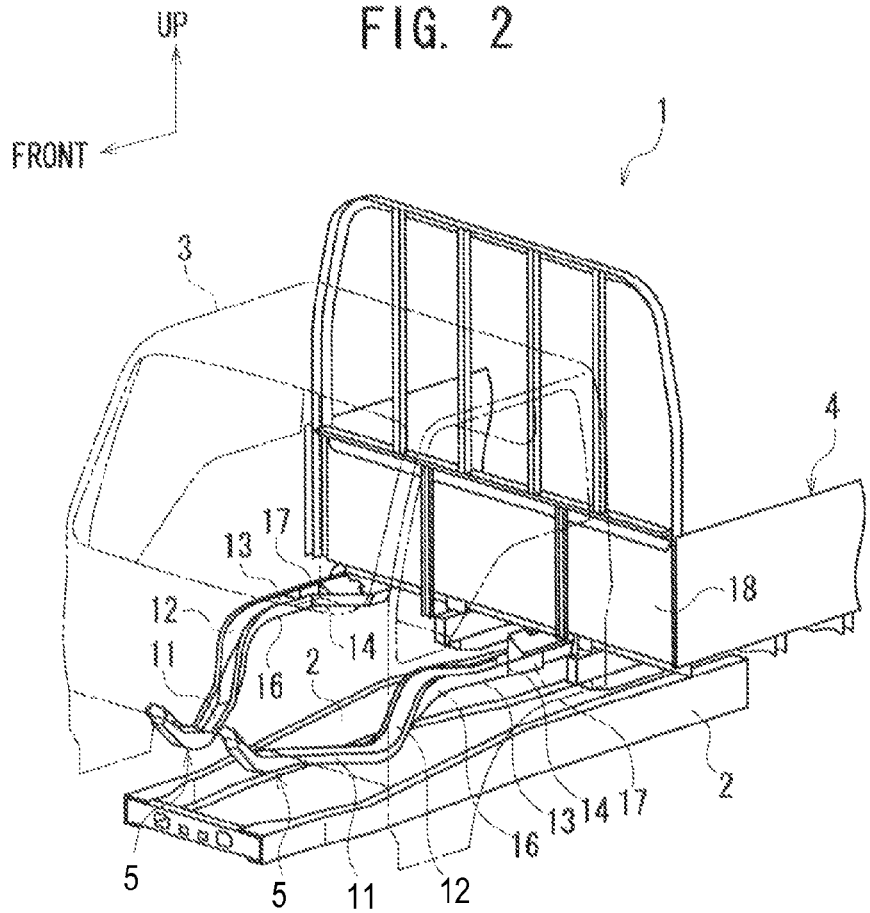

FLOOR UNDERFRAME OF VEHICLES

TECHNICAL FIELD

The present invention relates to the floor underframe arranged under the cab.

BACKGROUND ART

In general, a truck where the driver's seating position in the cab is arranged in front of the engine (hereafter called cab-over engine truck) has a pair of cab underframes (or floor underframes) arranged under the cab. This cab underframe includes a front section arranged on the front side, a rising section that rises from the back edge of the front section, and a back section that extends rearward from the upper end of the rising section; wherein a passenger seat is deployed on the back section.
Patent Document 1: JP-A 11-208516

DISCLOSURE OF THE INVENTION

Problems to be Solved by the Invention

However, since such a cab underframe has a rising section, the following problem may occur: when the cab-over-engine truck crashes against a rigid wall (hereafter, referred to as a barrier) (hereafter, this incident is referred to as a head-on collision), and a collision force (load) from the vehicle front is thus applied to the front end of the front section, stress may easily concentrate at the upper and lower ends of the rising section, resulting in the cab underframe buckled and deformed around those upper and lower ends. In such a case, the cab inner side of the front section in the cab may move toward the upper end of the rising section (the front of the back end section), the space on the front side of the passenger seat decreases. Furthermore, a passenger's leg etc. may be pinched between the front section of the cab and the passenger seat.

Such an inconvenience is avoidable by setting up a wider space on the front side of the passenger seat beforehand. However, provision of an excessively wider space on the front side of the passenger seat causes increase in dead space, and furthermore leads to an enlargement of the entire cab because the front side of the passenger seat, especially the front side of the driver's seat accommodates a pedal operation and is thus hard to be utilized for other applications.

Moreover, with the cab-over-engine truck equipped with the carrier behind the cab, the carrier may move forward due to an inertial force when it collides head-on against a barrier. In such as case, when a collision force from the rear of the vehicle is applied to the back end of the back section, stress concentrates at the upper and lower ends of the rising section in the same manner as the case where the aforementioned collision force is applied to the front section. This makes it difficult to secure sufficient space on the front side of the passenger seat.

Therefore, an objective of the present invention is to provide a floor underframe allowing sufficient space on the front side of a passenger seat in the case of a head-on collision of vehicles without requiring enlargement of the entire cab.

Means for Solving the Problems

The present invention, which should accomplish the above-given purpose, is a vehicle floor underframe, which is arranged under a cab including a driver's seat. It includes: a front section, which is deployed on the front side of the cab and extends along the length of the vehicle; a rising section, which bends at the back end of the front section and extends upward; a back section, which bends at the top end of the rising section and extends towards the rear of the vehicle and is deployed under the driver's seat; and a buckling section, which is formed in the back section and has stress concentration when a load from at least either the front end of the front section or the back end of the back section is applied in a compressing direction. The buckling section is deployed under approximately the center of the passenger seat along the length of the vehicle. The back section bends and deforms upwards at the buckling section when a load is applied from at least either the front end of the front section or the back end of the back section in a compressing direction.

With this structure, in the back section of the floor underframe is deployed the buckling section under approximately the center of the passenger seat along the length of the vehicle, and the floor underframe bends and deforms upward around the buckling section when a load is applied from the front end of the front section or the back end of the back section in the compressing direction. Therefore, when the vehicle collides head-on, and collision force (load from the vehicle front) thus acts on the front end of the front section, stress concentrates at the buckling section formed in the back section of the floor underframe. As a result, the floor underframe bends and deforms upwards toward the passenger seat. On the other hand, when the carrier moves forwards due to the head-on collision of the vehicle, and thus impulse force (load from vehicle rear) from the carrier acts on the floor underframe, stress may concentrate at the buckling section as in the case where a load acts on the above-mentioned front section, resulting in the floor underframe bent and deformed upwards toward the passenger seat. That is, when a load in the compressing direction has acted on the floor underframe, the floor underframe positively bends and deforms at a location under the passenger seat. As a result, relative movement of the front section (front end of the back section) of the cab to the front end of the back section (inner side of the front section in the cab) may be controlled. Therefore, since the space of the front side of the passenger seat can be secured without enlargement of the entire cab, it effectively prevents the passenger's legs from being pinched between the front section of the cab and the passenger seat.

Moreover, a back section may be formed of two or more components, and the buckling section may be constituted by the connecting part of two or more components.

With this structure, the back section is formed of two or more components, allowing division of the back section into a front side and a rear side, and also allowing integration of the front end of the back section into a single body with the front section and the rising section. In this case, the component containing the front side of the back section can be used for provision of strength that can endure some impact load. On the other hand, use of a thinner component as the rear side of the back section allows provision of sufficient strength that leads to stress concentration at the junction with the front side of the back section when a load acts on the floor underframe in the compressing direction. Therefore, suitable adjustment of the thickness (strength) of the floor underframe allows provision of a lighter floor underframe.

Moreover, since it is possible to separately fabricate the front side and the rear side into the back section of the large-sized floor underframes, easier fabrication of the floor underframe can be provided.

Furthermore, the back section formed from two or more components is arranged under the approximately planar the driver's seat. Therefore, by dividing the floor underframe into a component containing the front side of the back section and component containing the rear side of the back section, the component containing the rear side of the back section can be smaller than the component containing the front side of the back section. That is, the large-sized component including the front side of the back section is deployed in the portion that does not differ from model to model (lower part of the passenger seat). Therefore, by changing the small component including the back end of the back section into some form according to vehicle model, it is possible to make the large-sized component at the front end of the back section be a common component and to apply it to multiple vehicle models. Therefore, since it is possible to provide a common large-sized component and suitably handle changes in overall shape by using small components, it is easy to respond to design changes etc., and to provide a very versatile structure.

Effects of the Invention

According to the present invention, the space of the front side of a passenger seat may be secured by a simple structure at the time of a head-on collision of vehicles, without being accompanied by enlargement of the entire cab.

BRIEF DESCRIPTION OF THE DRAWINGS

FIG. 1 is a schematic side view of a cab-over-engine truck according to an embodiment;

FIG. 2 is an enlarged principal part perspective view of FIG. 1;

EXPLANATION OF REFERENCE NUMERALS

Figure 3:
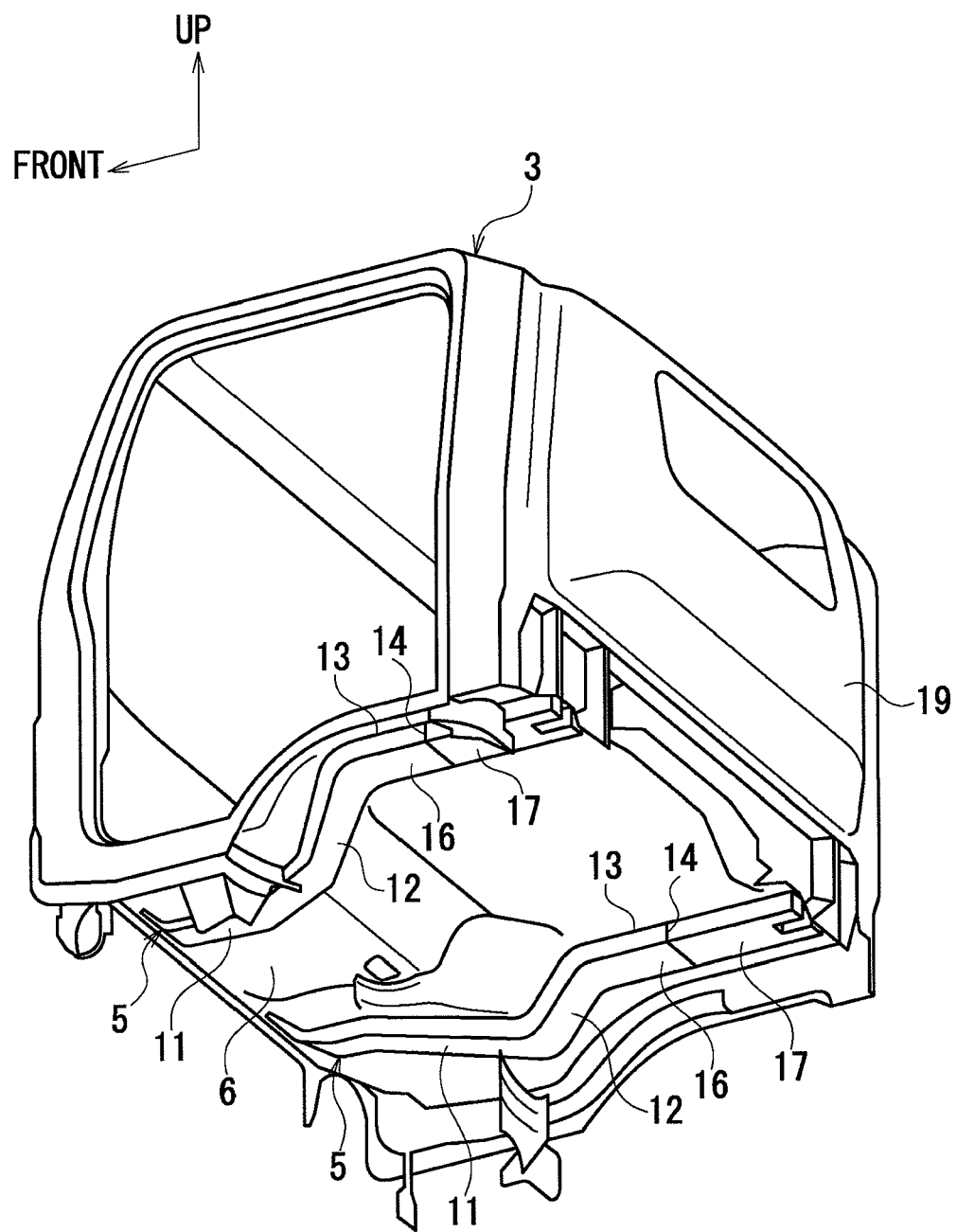
FIG. 3 is a perspective view of a cab when viewed from the bottom.

1 Cab-over-engine truck (Vehicle)
3 Cab
5 Floor underframes
7 passenger seat
11 Front Section
12 Rising section
13 Back section
14 Buckling section
16 Front side
17 Rear side

BEST MODE FOR CARRYING OUT THE INVENTION

Figure 4:
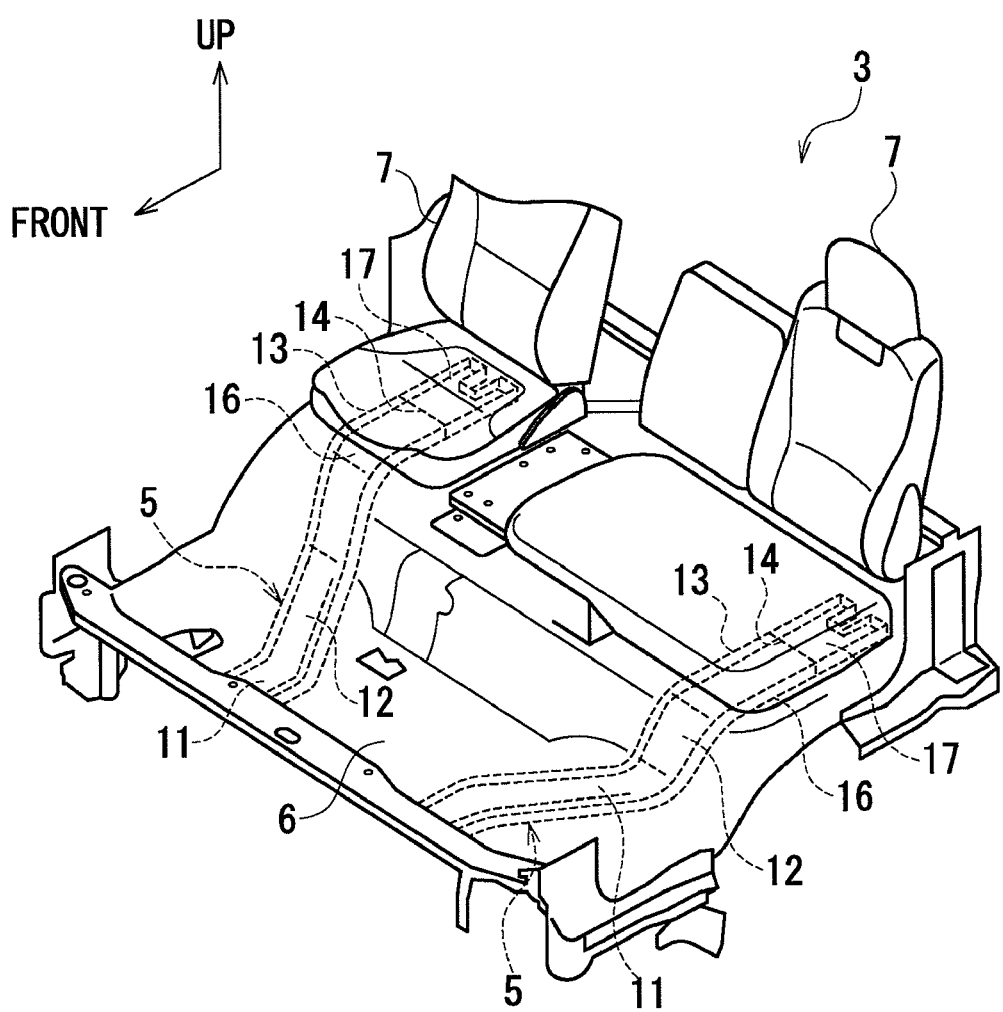
FIG. 4 is a perspective view of the arrangement of passenger seat and floor underframes.
Figure 5:
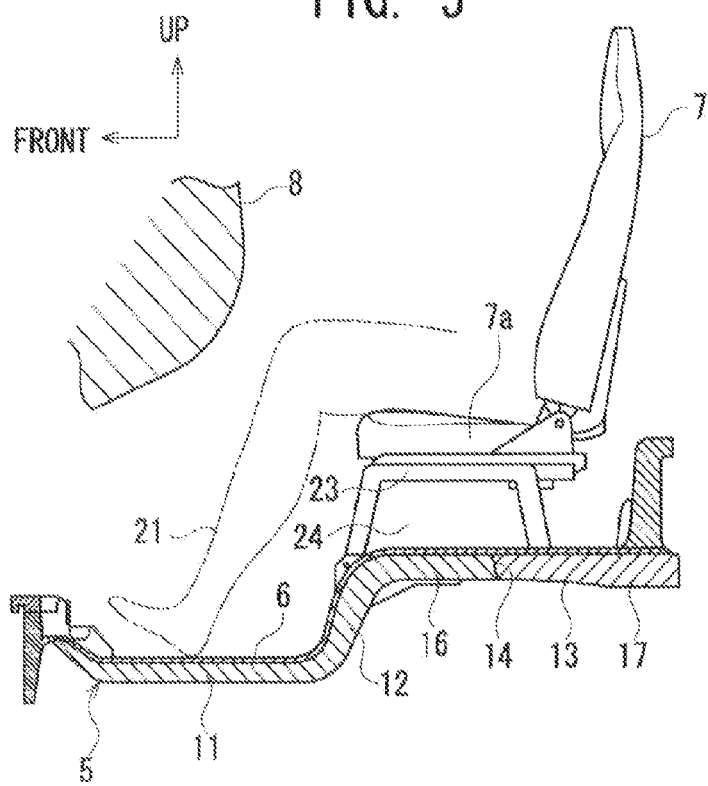
FIG. 5 is an enlarged principal part side view of the cab-over-engine truck before a head-on collision has occurred.
Figure 6:
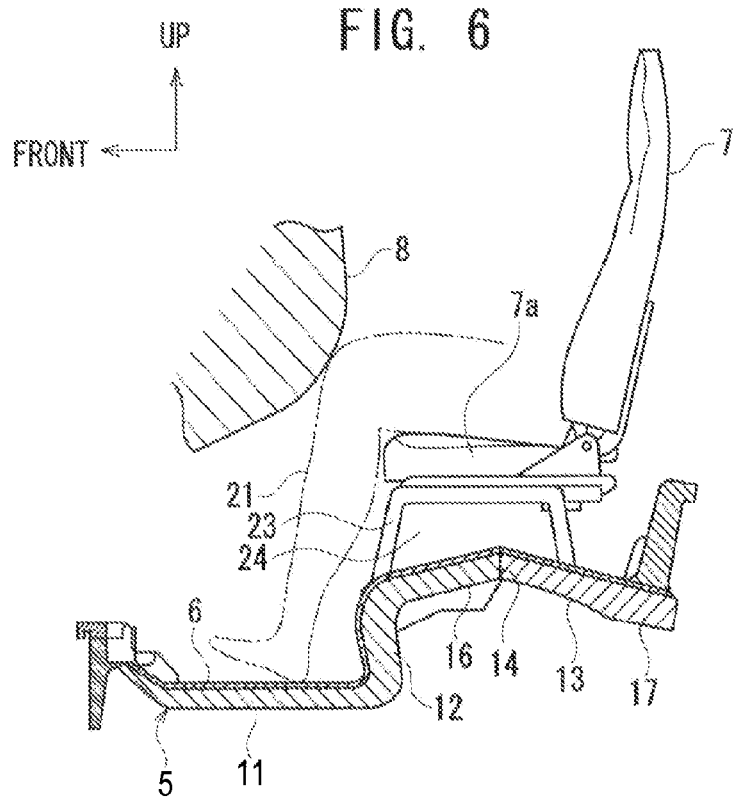
FIG. 6 is an enlarged principal part side view of the cab-over-engine truck after the head-on collision has occurred.

Hereafter, an embodiment according to the present invention is described based on the appended drawings. FIG. 1 is an illustration showing a side of a cab-over engine truck of the embodiment according to the present invention while FIG. 2 is an enlarged principal part perspective view of FIG. 1. FIG. 3 is a perspective view of the cab seen from the bottom thereof, FIG. 4 is a perspective view showing the layout of passenger seats and floor underframes, FIG. 5 is an enlarged principal part side view of the cab-over-engine truck before a head-on collision of the cab-over-engine truck has occurred, and FIG. 6 is an enlarged principal part side view of the cab-over-engine truck after the head-on collision of the cab-over-engine truck has occurred. Note that 'FRONT' in these illustrations denotes the vehicle front and that 'TOP' denotes the top of the vehicle. Moreover, 'horizontal direction' in the above description is defined to be relative to direction in which the vehicle is facing.

As shown in FIG. 1, the cab-over-engine truck (vehicle) 1 includes: a chassis frame 2, which extends along the length of the vehicle on either vehicle side in the vehicle width direction; a cab 3, which is supported by lower components in the front section of the chassis frame 2; a carrier 4, which is supported by lower components in the rear of the chassis frame 2; and floor underframes 5 (shown in FIG. 2), which are arranged under the cab 3.

As shown in FIGS. 2 to 5, the cab 3 includes a floor panel 6, which forms the floor of a passenger compartment; passenger seat 7, which are attached to specified positions on the floor panel 6; and an instrument panel 8, which is joined to the front end of the floor panel 6 and deployed in front of the passenger seat 7. A space for legs 21 of a passenger sitting down on the passenger seat 7 is prepared between the passenger seat 7 and the instrument panel 8. Moreover, as shown in FIG. 5, a seat base 7a of the passenger seat 7 is supported by the floor panel 6 via a seat support component 23, and a dead space 24 is secured under the seat base 7a.

As shown in FIG. 1, the carrier 4 is arranged behind the cab 3 along the width of the vehicle through an appropriate gap. A floor beam 9, which extends along the length of the vehicle, is fixed under both sides of the carrier 4. The main floor beam 9, which has a reverse hat-shaped cross section, is mounted and fixed on the chassis frame 2 with U-bolts 10, with the bottom face of the main floor beam 9 joined to an upper part of the chassis frame 2.

As shown in FIGS. 2 to 4, the floor underframes 5, each having an approximately U-shaped cross section, are fixed along both sides of the vehicle, extending along the length of the vehicle. Each of the floor underframes 5 includes: a front section 11, which is approximately horizontally arranged at the vehicle front; a rising section 12, which bends at the back end of the front section 11 and inclines upward in the vehicle; a back section 13, which bends at the top edge of the rising section 12 and horizontally extends towards the rear of the vehicle, and a buckling section 14 formed at the back section 13. The floor underframe 5 is adhered and fixed to the cab 3 by bringing the floor underframe 5 into contact with the undersurface of the floor panel 6 in the cab 3 and welding the contact part.

The front end of the front section 11 is supported by the tilt shaft of the front cab mount (illustrations thereof are omitted) deployed at the front end of the chassis frame 2 so that the cab will be able to tilt. The back end of the back section 13 is supported by a pillar leg for mounting of the rear cab fixed to the chassis frame 2 (illustrations thereof are omitted) via a lock mechanism (illustrations thereof are omitted) so as to allow easy attachment and detachment.

The passenger seat 7 is deployed above the back section 13 while an engine (illustrations thereof are omitted) etc. is arranged thereunder. Furthermore, the back section 13 is divided into a front side 16 arranged in the front and a rear side 17 arranged in the rear relative a the position approximately underneath the center of the passenger seat 7 along the length of the vehicle as a border therebetween. Moreover, the front side 16 and the rear side 17 are joined by welding etc.

The floor underframe 5 is constituted by two components separated by a border or the connecting portion between the front side 16 of the back section 13 and the rear side 17. With this embodiment, the front section 11, the rising section 12, and the front side 16 of the back section 13 are integrated into a single body. The component containing this front side 16 has a thickness (strength) capable of enduring a load that is applied in a compressing direction from at least either of the front end of the front section 11 or the back end of the back section 13. On the other hand, since the rear side 17 of the back section 13 is established thinner than the thickness of the component containing the front side 16, it has a strength intolerable against the applied load in the above-mentioned compressing direction.

The buckling section 14 is constituted by the connecting portion between the front side 16 of the back section 13 and the rear side 17. Namely, if a load is applied from at least either of the front end of the front section 11 or the back end of the back section 13 in the compressing direction, stress concentrates at the buckling section 14 or the connecting part due to the difference in thickness (strength) between the front side 16 of the back section 13 and the rear side 17, and thus the back section 13 bends and deforms upward around the buckling section 14.

Next, movement of the floor underframe when a collision occurs is explained with reference to FIGS. 1, 5, and 6.

As shown in FIG. 5, the front side 16 and the rear side 17 of the back section 17 of the floor underframe 5 are deployed approximately horizontally before a collision occurs, and a space for the legs 21 of a passenger sitting down on the passenger seat 7 is secured on the front side of the passenger seat 7 between it and the instrument panel 8.

As shown in FIGS. 1 and 6, when the cab-over-engine truck 1 collides head-on against a barrier 51, collision force will act on the front end of the cab 3 including the front end of the front section 11 in the floor underframe 5.

Moreover, when the cab-over-engine truck 1 collides head-on to the barrier 51, collision force (load from the vehicle front) will act on the front end of the chassis frame 2, and most of the kinetic energy thereof will be absorbed due to the effectively deformed front end of the rigid chassis frame 2. In this case, since the chassis frame 2 slows down quickly, the carrier 4 starts moving toward the front. When a lower part of the front 18 of the carrier 4 (refer to FIG. 2) collides against a rear 19 (refer to FIG. 3) of the cab 3, impulse force from the carrier 4 (load from the vehicle back) will act on the back section 13 of the floor underframe 5.

With the floor underframe 5 according to this embodiment, when the collision force acts on at least either the front end of the front section 11 or the back end of the back section 13, stress concentrates at the buckling section 14 formed in the back section 13, and thus the floor underframe 5 bends and deforms upwards around the buckling section 14. Moreover, since the buckling section 14 is formed under approximately the center along the length of the vehicle, a bend and deformation of the back section 13 causes the entire cab 3 to deform in the compressing direction around a location in the floor panel 6 that the passenger seat 7 is deployed. Namely, although the space in the cab 3 decreases on the whole, space of the front side of the passenger seat 7 is secured. This may prevent the legs 21 of a passenger sitting on the passenger seat 7 from being pinched by the instrument panel 8 when a load from the vehicle front or the vehicle rear is exerted. Moreover, since the dead space 24 is secured under the seat base 7a of the passenger seat 7, and the floor underframe 5 is bent upwards within this dead space 24, there is little influence on the inner space of the cab 3 even if the floor underframe 5 is bent upwards.

In summary with this embodiment, in the back section 13 of the floor underframe 5 is deployed the buckling section 14 under approximately the center of the passenger seat 7 along the length of the vehicle, and the floor underframe 5 bends and deforms upward around the buckling section 14 when a load is applied from the front end of the front section 11 or the back end of the back section 13 in the compressing direction. Therefore, when the cab-over-engine truck 1 collides head-on, and collision force (load from the vehicle front) thus acts on the front end of the front section 11, stress concentrates at the buckling section 14 formed in the back section 13 of the floor underframe 5. As a result, the floor underframe 5 bends and deforms upwards toward the passenger seat 7. On the other hand, when the carrier 4 moves forwards due to the head-on collision of the cab-over engine truck 1, and thus impulse force (load from vehicle rear) from the carrier 4 acts on the floor underframe 5, stress may concentrate at the buckling section 14 as in the case where a load acts on the above-mentioned front section 11, resulting in the floor underframe 5 bent and deformed upwards toward the passenger seat 7. That is, when a load in the compressing direction acts on the floor underframe 5, the floor underframe 5 actively bends and deforms at a location under the passenger seat 7. As a result, relative movement to the front end of the back section 13 and the instrument panel 8 may be controlled. Therefore, since the space of the front side of the passenger seat 7 can be secured without enlargement of the entire cab 3, it effectively prevents the passenger's legs 21 from being pinched between the instrument panel 8 of the cab 3 and the passenger seat 7.

Moreover, with the floor underframe 5, since the front side 16 and rear side 17 of the back section 13 are formed separately, and the front section 11, the rising section 12, and the front side 16 of the back section 13 are formed into a single body, a thicker component containing the front side 16 of the back section 13 can be used for provision of strength that can endure some impact load. On the other hand, use of a thinner component as the rear side 17 of the back section 13 allows provision of sufficient strength that leads to stress concentration at the junction with the front side 16 of the back section 13 when a load acts on the floor underframe 5 in the compressing direction. Therefore, suitable adjustment of the thickness (strength) of the floor underframe 5 allows provision of a lighter floor underframe 5.

Moreover, since it is possible to separately fabricate the front side 16 and the rear side 17 into the back section 13 of the large-sized floor underframes 5, easier fabrication of the floor underframe 5 can be provided.

Furthermore, the back section 13 formed from the front side 16 and the rear side 17 is arranged under the approximately planar passenger seat 7. Therefore, by dividing the floor underframe 5 into a component containing the front side 16 of the back section 13 and component containing the rear side 17 of the back section 13, the component containing the rear side 17 of the back section 13 can be smaller than the component containing the front side 16 of the back section 13. That is, the large-sized component including the front side 16 of the back section 13 is deployed in the portion that does not differ from model to model (lower part of the passenger seat 7). Therefore, by changing the small component including the back end 17 of the back section 13 into some form according to vehicle model, it is possible to make the large-sized component including the front side 16 of the back section 13 be a common component and to apply it to multiple vehicle models. Therefore, since it is possible to provide a common large-sized component and suitably handle changes in overall shape by using small components, it is easy to respond to design changes etc., and to provide a very versatile structure.

In addition, while with this embodiment a buckling section is constituted using two components differing in thickness (strength), it may also be constituted by preparing apertures, for example, such as a notch or a hole, in a specified position of the floor underframe made of the same component.

While the embodiment according to the invention devised by the inventor(s) has been described thus far, the present invention is not limited to the descriptions and drawings of the embodiment constituting a part of this disclosure according to the present invention. Namely, it should be added that other embodiments, working examples, and operational technologies devised by person(s) skilled in the art according to this embodiment are all naturally included within the scope of this invention.

INDUSTRIAL APPLICABILITY

The present invention is applicable to various vehicles having a floor underframe.

The invention claimed is:

1. A vehicle floor underframe, which is arranged under a cab including a driver's seat, said floor underframe comprising:
    a front section, which is deployed on the front side of the cab and extends along the length of the vehicle;
    a rising section, which bends at the back end of the front section and extends upward;
    a back section, which bends at the top end of the rising section and extends towards the rear of the vehicle and is deployed under the driver's seat; and
    a buckling section, which is formed in the back section and has stress concentration when a load from at least either the front end of the front section or the back end of the back section is applied in a compressing direction; wherein
    the back section comprises a front side and a rear side which are formed with another component,
    a rear end surface of the front side and a front end surface of the rear side are mutually opposed in a vehicle length direction,
    the buckling section comprises a connecting portion between the rear end surface of the front side and the front end surface of the rear side,
    the buckling section is deployed under approximately the center of the passenger seat along the length of the vehicle, and
    the back section bends and deforms upwards at the buckling section when a load is applied from at least either the front end of the front section or the back end of the back section in a compressing direction.

* * * * *